United States Patent [19]
Fukunaga et al.

[11] Patent Number: 6,081,296
[45] Date of Patent: Jun. 27, 2000

[54] PICTURE CODER, PICTURE DECODER, AND PICTURE TRANSMISSION SYSTEM IN WHICH ACKNOWLEDGMENT SIGNALS ARE SENT IN PACKED FORM

[75] Inventors: Shigeru Fukunaga; Toshihisa Nakai, both of Tokyo, Japan

[73] Assignee: Oki Electric Industry Co., Ltd., Tokyo, Japan

[21] Appl. No.: 08/923,535

[22] Filed: Sep. 4, 1997

[30]      Foreign Application Priority Data

Sep. 4, 1996   [JP]   Japan .................................. 8-233820

[51] Int. Cl.[7] ...................................................... H04N 7/24
[52] U.S. Cl. ........................ 348/415; 348/420; 348/845.1
[58] Field of Search ................... 348/384, 390, 348/409, 415, 420, 845, 845.1

[56]             References Cited

U.S. PATENT DOCUMENTS 4,368,512   1/1983   Kyu ......................................... 710/107
  4,827,339   5/1989   Wada ....................................... 348/390
  5,105,423   4/1992   Tanaka ..................................... 714/708
  5,774,483   6/1998   Hwang ....................................... 371/62

OTHER PUBLICATIONS

H. Yasuda, Maruchimedia Fugoka no Kokusai Hyojun (International Standards for Multimedia Coding), Maruzen, 1991, pp. 84–97.
International Telecommunication Union, Line Transmission of Non–Telephone Signals, ITU–T Recommendation H.261, Mar. 1993, pp. 1–25.

*Primary Examiner*—Bryan Tung
*Attorney, Agent, or Firm*—Wenderoth, Lind & Ponack, L.L.P.

[57]             ABSTRACT

In a system that uses inter-frame coding to compress blocks of data for transmission from a transmitting device to a receiving device, and sends acknowledgment signal back from the receiving device to the transmitting device, the receiving device packs decoding-error information about multiple blocks into each acknowledgment signal. The transmitting device unpacks the acknowledgment signal to obtain the decoding-error information, and uses this information to keep from performing inter-frame coding with reference to data that the receiving device was unable to decode. The bandwidth saved by packing information about multiple blocks into each acknowledgment signal can be used to enhance reliability by repeating the information in multiple acknowledgment signals.

44 Claims, 10 Drawing Sheets a b c d e f g h i j k a b c d e f g h i j k

_PICTURE CODER, PICTURE DECODER,
AND PICTURE TRANSMISSION SYSTEM IN
WHICH ACKNOWLEDGMENT SIGNALS
ARE SENT IN PACKED FORM_

BACKGROUND OF THE INVENTION

The present invention relates to a picture coder, picture decoder, and picture transmission system that combine reliable inter-frame decoding with efficient use of bandwidth.

Inter-frame coding compresses data in, for example, systems that transmit digitized moving pictures through communication networks. Examples of such systems include videophone, videoconferencing, and video-on-demand (VOD) systems. Standards for inter-frame coding have been established by the Moving Picture Experts Group (MPEG) and the Telecommunication Standardization Sector of the International Telecommunication Union (ITU-T), e.g. in ITU-T Recommendation H.261.

In these and similar standards, when a sequence of frames is transmitted, as in a moving picture, certain frames are coded as intra-frames, and the rest are coded as inter-frames. Intra-frames, also referred to as I-frames, are coded independently. Inter-frames, also referred to as predicted frames or P-frames, are coded in relation to a preceding reference frame, by coding only the differences between the inter-frame and the reference frame.

Inter-frame coding can greatly reduce the amount of coded data, but there is a problem. An inter-frame can be successfully decoded only if its reference frame has already been successfully decoded. If the reference frame is dropped (lost) or damaged (corrupted) in transmission, or if the vagaries of network communication cause the reference frame to arrive after the inter-frame, the inter-frame cannot be decoded. In the H.261 system, in which each inter-frame is coded with reference to the immediately preceding frame, the failure to decode even a single frame disables further decoding until the next intra-frame is received, and can lead to a lengthy episode of picture degradation.

As a solution to this problem, the present inventors have developed a picture transmission system in which the picture decoder notifies the picture coder of which frames were successfully decoded. The notification takes the form of a positive or negative acknowledgment signal transmitted from the picture decoder to the picture coder. Given such notification, the picture coder can quickly stop using reference frames that the picture decoder was unable to decode, thereby avoiding lengthy sequences of undecodable inter-frames. Relevant information can be found in U.S. patent application Ser. No. 08/710,405 and European Patent Application No. 96113836.9 (EP 0 763 944 A2).

This solution markedly improves the quality of moving pictures transmitted over unreliable communication networks and channels, but requires extra bandwidth for the transmission of the acknowledgment signals. In transmission systems with limited total bandwidth, one consequence is a diminished amount of bandwidth available for transmitting coded picture data from the picture coder to the picture decoder, forcing the picture coder to operate at a reduced frame rate. In other transmission systems, the bandwidth for transmitting the acknowledgment signals must be purchased at an extra cost.

In a variation of the above system, each frame is divided into two or more blocks, which are coded and decoded separately, and separate acknowledgment signals are transmitted for each block. This variation increases the probability of successful decoding, but also increases the amount of bandwidth required for transmitting acknowledgment signals. Moreover, as more acknowledgment signals are transmitted, the probability that an acknowledgment signal itself will be dropped or damaged in transmission increases.

SUMMARY OF THE INVENTION

It is accordingly an object of the present invention to reduce the bandwidth required for transmitting acknowledgment signals in a picture transmission system.

Another object of the invention is to increase the reliability of the acknowledgment signals.

Yet another object is to achieve an optimal balance between reliability and bandwidth usage.

According to the present invention, in a transmission system that transmits coded frames, each made up of one or more blocks of data, from a coder to a decoder, and transmits acknowledgment signals from the decoder to the coder to indicate which blocks were successfully decoded, the decoder packs decoding-error information about a plurality of blocks into each acknowledgment signal. The coder unpacks each acknowledgment signal to obtain decoding-error information about the individual blocks, and uses this information in selecting reference frames for inter-frame coding.

Decoding-error information can be packed into an acknowledgment signal by, for example, placing the frame numbers and block numbers of the relevant blocks in the acknowledgment signal, or by using bit flags to indicate blocks in which decoding errors occurred.

The decoding-error information about each block can be transmitted repeatedly, in two or more acknowledgment signals. In this case, each acknowledgment signal preferably carries a mixture of new decoding-error information, being transmitted for the first time, and old decoding-error information that has been transmitted before. The coder can resolve conflicts in error-decoding information received for the same block in different acknowledgment signals by, for example, a majority-vote rule, or alternatively, by regarding a block as having been incorrectly decoded if a decoding error is reported for that block in any acknowledgment signal.

The number of times the error-decoding information about each block is sent is preferably determined according to an assessment of the quality of the channel over which the acknowledgment signals are transmitted. This assessment can be made automatically at the coder, on the direct basis of the frequency of signal errors in the acknowledgment signals, or automatically at the decoder, on the indirect basis of the frequency of decoding errors. Alternatively, the assessment can be made by a human operator at the coder or decoder. If the assessment is made at, the coder, the coder sends the decoder the result of the assessment, or sends the decoder explicit instructions to repeat decoding-error information about each block a certain number of times.

By packing the decoding-error information about multiple blocks into a single acknowledgment signal, the present invention reduces the bandwidth required for transmitting the acknowledgment signals.

Even when the same decoding-error information is repeated in different acknowledgment signals, the bandwidth required for the acknowledgment signals can still be reduced, and in addition, the reliability of the decoding-error information can be increased.

By adjusting the number of times the same decoding-error information is repeated, the invention can achieve an optimal balance between reliability and bandwidth usage.

DETAILED DESCRIPTION OF THE INVENTION

Embodiments of the invention will be described with reference to the attached illustrative drawings.

First Embodiment

Figure 1:
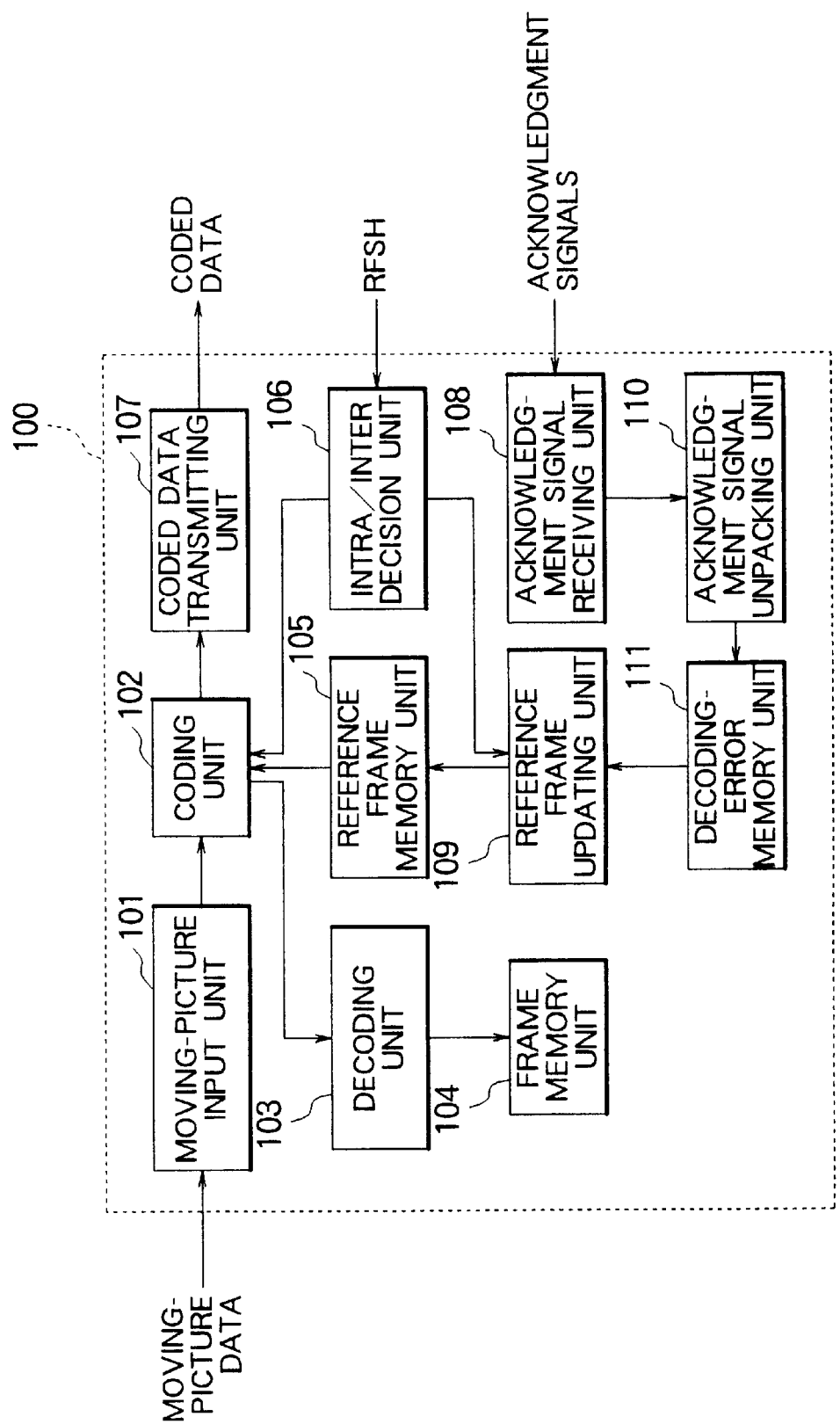
FIG. 1 is a functional block diagram of the picture coder in a first embodiment of the invention.

Referring to FIG. 1, the transmitting device in the first embodiment is a moving-picture coder 100 comprising a moving-picture input unit 101, a coding unit 102, a decoding unit 103, a frame memory unit 104, a reference frame memory unit 105, an intra/inter decision unit 106, a coded data transmitting unit 107, an acknowledgment signal receiving unit 108, a reference frame updating unit 109, an acknowledgment signal unpacking unit 110, and a decoding-error memory unit 111.

The moving-picture input unit 101 furnishes successive frames of moving-picture data input from a video camera, for example, to the coding unit 102. The coding unit 102 codes the input frame data, and furnishes the coded data to the decoding unit 103 and coded data transmitting unit 107. The coding unit 102 performs intra-frame coding and inter-frame coding at the direction of the intra/inter decision unit 106.

Each frame consists of one or more blocks and the coding unit 102 codes each block separately. For inter-frame coding, the coding unit 102 refers to reference frame data stored in the reference frame memory unit 105, and codes only the difference between the current block and the corresponding block in the reference frame.

The decoding unit 103 decodes the coded data received from the coding unit 102, and writes the decoded blocks, with their block numbers and frame numbers, into the frame memory unit 104. The reference frame updating unit 109 copies blocks from a selected reference frame from the frame memory unit 104 into the reference frame memory unit 105, for use in inter-frame coding.

The intra/inter decision unit 106 selects intra-frame coding or inter-frame coding for each block, and notifies the coding unit 102, decoding unit 103, coded data transmitting unit 107, and reference frame updating unit 109 of the selection. Normally, intra-frame coding is selected at regular intervals (once every thirty frames, for example), and inter-frame coding is selected at other times. However, the intra/inter decision unit 106 may receive a refresh signal (RFSH), which forces intra-frame coding to be selected.

The coded data transmitting unit 107 transmits the coded data through a transmission channel (not visible) to a moving-picture decoder, or to a plurality of moving-picture decoders at different receiving sites. The transmitted data include an intra/inter flag indicating intra-frame or inter-frame coding, reference frame numbers in the case of inter-frame coding, and other header information as necessary.

The acknowledgment signal receiving unit 108 receives acknowledgment signals from the moving-picture decoder. Each acknowledgment signal contains decoding-error information for a plurality of blocks. The acknowledgment signal unpacking unit 110 unpacks the acknowledgment signal to obtain decoding-error information indicating whether the moving-picture decoder was able to decode each block, and writes this information in the decoding-error memory unit 111. The reference frame updating unit 109 selects reference frames on the basis of the information stored in the decoding-error memory unit 111.

Figure 2:
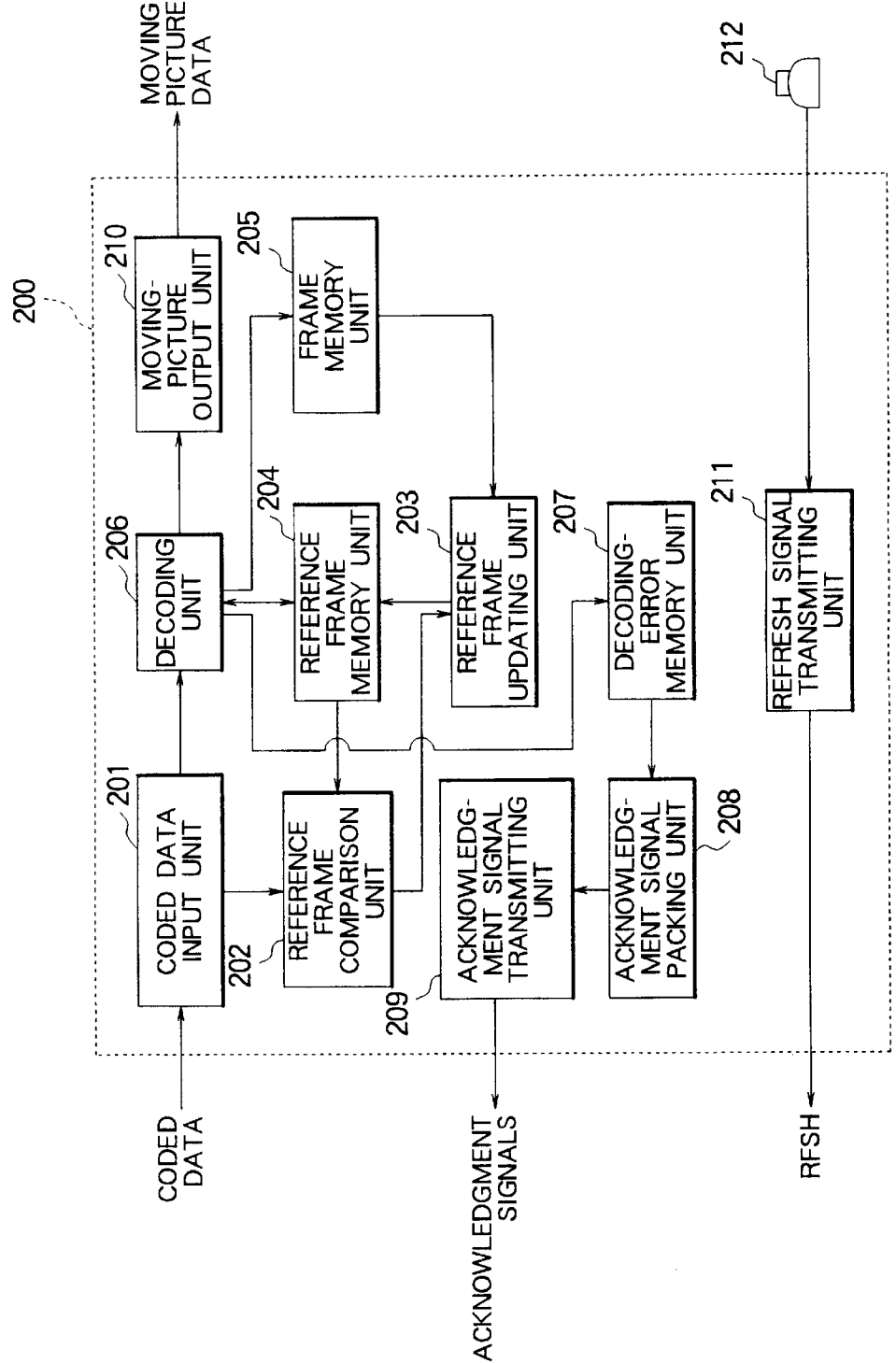
FIG. 2 is a functional block diagram of the picture decoder in the first embodiment.

Referring to FIG. 2, the receiving device in the first embodiment is a moving-picture decoder 200 comprising a coded data input unit 201, a reference frame comparison unit 202, a reference frame updating unit 203, a reference frame memory unit 204, a frame memory unit 205, a decoding unit 206, a decoding-error memory unit 207, an acknowledgment signal packing unit 208, an acknowledgment signal transmitting unit 209, a moving-picture output unit 210, and a refresh signal transmitting unit 211.

The coded data input unit 201 receives the coded data and header information transmitted from the moving-picture coder 100, furnishes the coded data, intra/inter flags, and reference frame numbers to the decoding unit 206, and also furnishes the reference frame numbers to the reference frame comparison unit 202.

The reference frame comparison unit 202 compares each reference frame number received from the coded data input unit 201 with a reference frame number stored in the reference frame memory unit 204. If the received reference frame number is newer than the stored reference frame number, the reference frame comparison unit 202 passes the received reference frame number to the reference frame updating unit 203, which copies the necessary block or blocks of decoded data having that frame number from the frame memory unit 205 to the reference frame memory unit 204.

The decoding unit 206 decodes the coded data a block at a time, referring to the data stored in the reference frame memory unit 204 when inter-frame coding in indicated, and writes decoding-error information in the decoding-error memory unit 207 indicating whether the decoding of each block was successful or not. Successfully decoded blocks are stored in the frame memory unit 205, and passed to the moving-picture output unit 210 for output to a monitor display device or similar device.

The acknowledgment signal packing unit 208 reads the decoding-error information pertaining to a plurality of blocks from the decoding-error memory unit 207, and packs this information into a single acknowledgment signal. The acknowledgment signal transmitting unit 209 transmits the acknowledgment signal back to the moving-picture coder 100 over a transmission channel (not visible). The refresh signal transmitting unit 211 receives refresh requests from a user-controlled input device 212 and sends corresponding refresh (RFSH) signals to the moving-picture coder 100.

Next, the operation of the first embodiment will be described.

Figure 3:
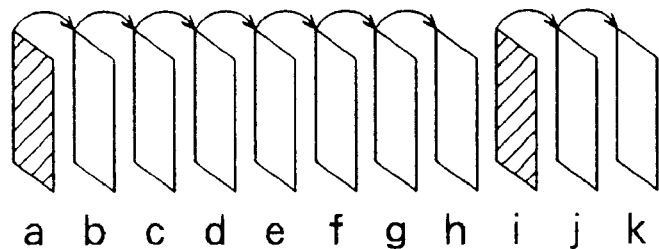
FIG. 3 illustrates inter-frame coding and decoding.

FIG. 3 shows a series of corresponding blocks in successive frames and illustrates the reference-frame relationships when no decoding errors occur. The hatched blocks (a and i) are coded and decoded by intra-frame coding and decoding. The other blocks are coded and decoded by inter-frame coding and decoding, in each case with reference to the corresponding block in the preceding frame.

Figure 4:
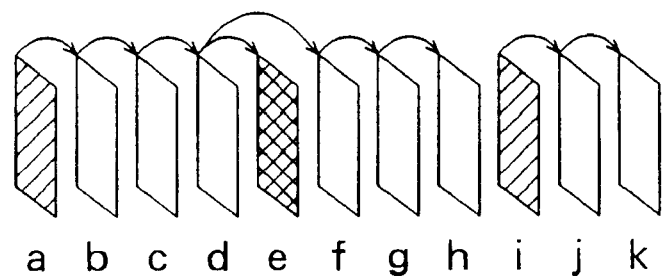
FIG. 4 illustrates inter-frame coding and decoding when a decoding error occurs.

FIG. 4 shows the same operation when a decoding error occurs in block e, due to a data error in the transmission channel, for example. The moving-picture coder 100 is notified of the coding error in an acknowledgment signal, and codes the next block f with reference to block d instead of block e. As a result, block f and the subsequent blocks are successfully decoded.

Many variations are possible within this basic scheme. Positive acknowledgment signals, reporting blocks that were successfully decoded, may be sent, or negative acknowledgment signals, reporting decoding errors, may be sent, or both types of acknowledgment signals may be sent. Under adverse communication conditions, the moving-picture decoder 200 preferably sends positive acknowledgment signals, and the moving-picture coder 100 preferably uses only reference frames that have been positively acknowledged. Under favorable communication conditions, negative acknowledgment signals are advantageous, the moving-picture coder 100 being adapted to use the preceding frame as a reference frame unless a negative acknowledgment is returned, in which case the reference frame is set back to an earlier frame. Negative acknowledgment signals may include desired reference frame numbers for use in the coding of subsequent blocks.

Extended periods of picture degradation normally do not occur in the first embodiment, because the acknowledgment signals prevent undecodable blocks from being used for reference in inter-frame coding, but if extended degradation occurs anyway, possibly because of an error in an acknowledgment signal, the human operator at the moving-picture decoder 200 can use the input device 212 to request an intra-frame and thereby restore good picture quality.

Next, several methods of constructing the acknowledgment signals will be described. Any one of these methods may be adopted in this embodiment, and in the other embodiments described below.

Figure 5:
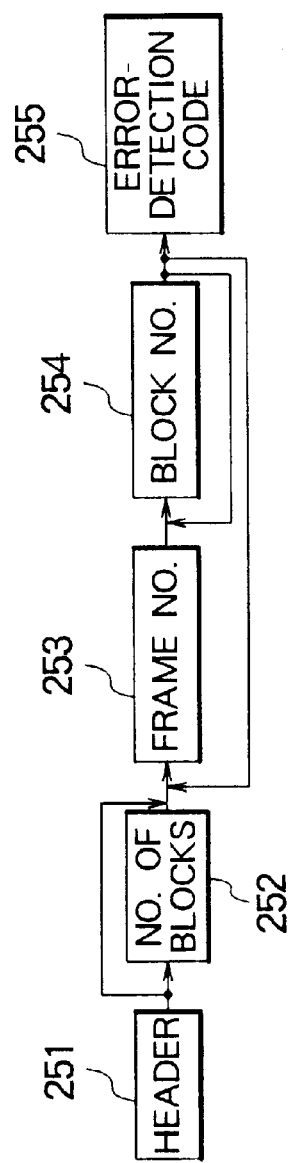
FIG. 5 is a syntax diagram illustrating a method of packing decoding-error information into an acknowledgment signal.

FIG. 5 shows the syntax of an acknowledgment signal comprising a header 251, followed by a number-of-blocks field 252 indicating the number of blocks being acknowledged, then the frame numbers 253 and block numbers 254 of the acknowledged blocks, and finally an error-detection code 255. As indicated by the arrows, when two or more blocks in the same frame are acknowledged, the frame number need be given only once. If the blocks span two or more frames, the frame number is given only when the frame changes. The frame numbers and block numbers should include a bit indicating whether each number is a frame number or a block number.

The type of acknowledgment signal illustrated in FIG. 5 can be used for positive acknowledgment signals, or for negative acknowledgment signals not accompanied by desired reference frame numbers.

Figure 6:
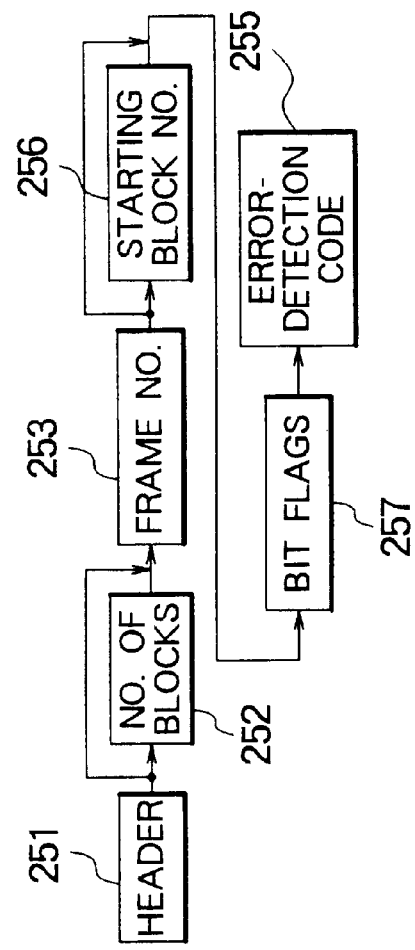
FIG. 6 is a syntax diagram illustrating another method of packing decoding-error information into an acknowledgment signal.

FIG. 6 shows the syntax of an acknowledgment signal comprising a header 251, a number-of-blocks field 252, a frame number 253, a starting block number 256, a bit-flag field 257, and an error-detection code 255. The bit-flag field 257 is a string of bits which can be set to one value (e.g. '1') to report successful decoding, and to another value (e.g. '0') to report a decoding error. Thus, if the number-of-blocks field 252 specifies seven blocks and the starting block number is three, a value of '1101011' in the bit-flag field can be used to report that blocks three, four, six, eight, and nine were successfully decoded, and that decoding errors occurred in blocks five and seven.

If there are only eight blocks in a frame, the final bit in this bit-flag field ('1101011') indicates that the first block in the next frame was successfully decoded.

Figure 7:
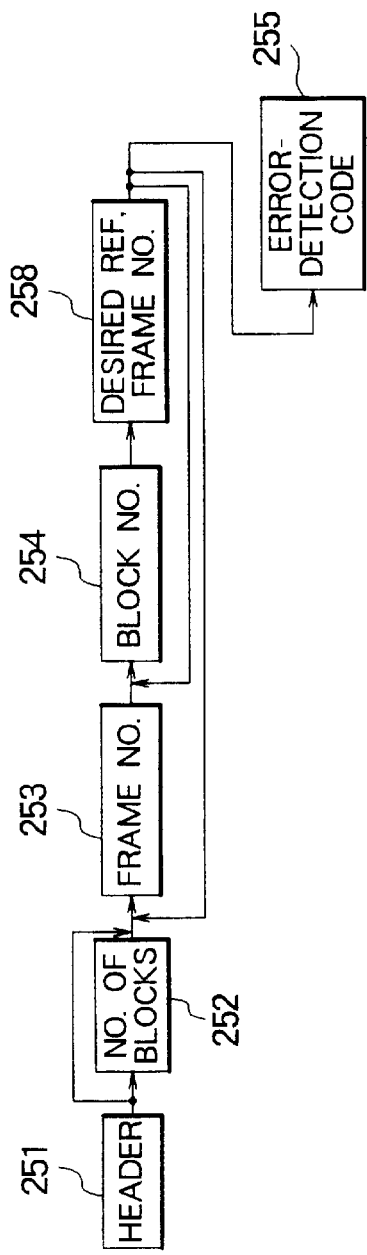
FIG. 7 is a syntax diagram illustrating a method of packing decoding-error information and desired reference frame numbers into an acknowledgment signal.

FIG. 7 shows the syntax of an acknowledgment signal that can be used to return negative acknowledgments accompanied by desired reference frame numbers. This acknowledgment signal is similar to the one in FIG. 5, but each block number 254 is followed by a desired reference frame number 258, typically the number of the most recent frame in which the corresponding block was successfully decoded.

Figure 8:
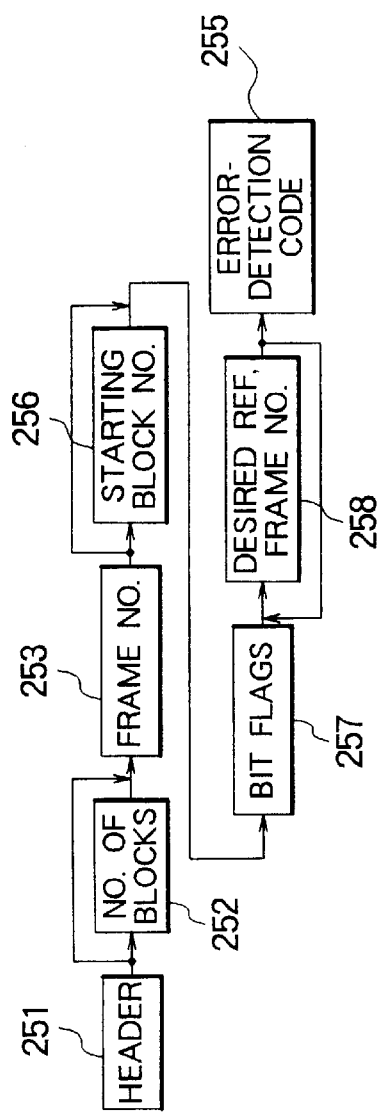
FIG. 8 is a syntax diagram illustrating another method of packing decoding-error information and desired reference frame numbers into an acknowledgment signal.

FIG. 8 shows another acknowledgment signal, which adds desired reference frame numbers to the bit-flag scheme of FIG. 6. One desired reference frame number 258 is given for each flag bit that indicates a decoding error.

The error-detection codes 255 in the acknowledgment signals in FIGS. 5, 6, 7, and 8 are checked by the acknowledgment signal unpacking unit 110, enabling the acknowledgment signal unpacking unit 110 to detect most signal errors in the acknowledgment signals. Depending on the type of error-detection code, the acknowledgment signal unpacking unit 110 may also be able to correct minor errors such as one-bit errors. When the acknowledgment signal unpacking unit 110 detects an uncorrectable error in an acknowledgment signal, all of the blocks acknowledged in that acknowledgment signal are regarded as having decoding errors.

When decoding-error information about a large number of blocks is packed into one acknowledgment signal, a comparatively long error-detection code 255 should be used, to provide robust error protection.

In all of FIGS. 5, 6, 7, and 8, bandwidth is saved by transmitting a plurality of block numbers with only one header 251 and only one error-detection code 255, and omitting unnecessary frame numbers. When every block in every frame is acknowledged, the acknowledgment signals of FIGS. 6 and 8 save further bandwidth by using bit flags.

Still further bandwidth can be saved in this case by eliminating the number-of-blocks field 252, and always acknowledging a fixed number of blocks in each acknowledgment signal. The number of bits needed to encode the starting block number 256 can be reduced by restricting the starting blocks to, for example, block numbers zero, five, ten, fifteen, and so on, and encoding these by index numbers (zero, one, two, three, and so on). Alternatively, the starting block numbers 258 can be eliminated entirely by using each acknowledgment signal to acknowledge all blocks in one frame.

Even without these further bandwidth-reduction measures, the first embodiment enables considerable bandwidth to be saved. For example, the inventors have evaluated a system that transmits frames divided into nine blocks each at a frame rate of ten frames per second with a data rate of twenty-four kilobits per second (24 kbits/s). Transmitting a separate acknowledgment signal for each block would require additional bandwidth equivalent to two thousand one hundred sixty bits per second (2160 bits/s). Packing the decoding-error information for two blocks into one acknowledgment signal reduces this to 1170 bits/s (54%), and packing the decoding-error information for three blocks into one acknowledgment signal gives a reduction to 810 bits/s (38%).

Second Embodiment

The second embodiment transmits the decoding-error information about each block in a plurality of acknowledgment signals.

Figure 9:
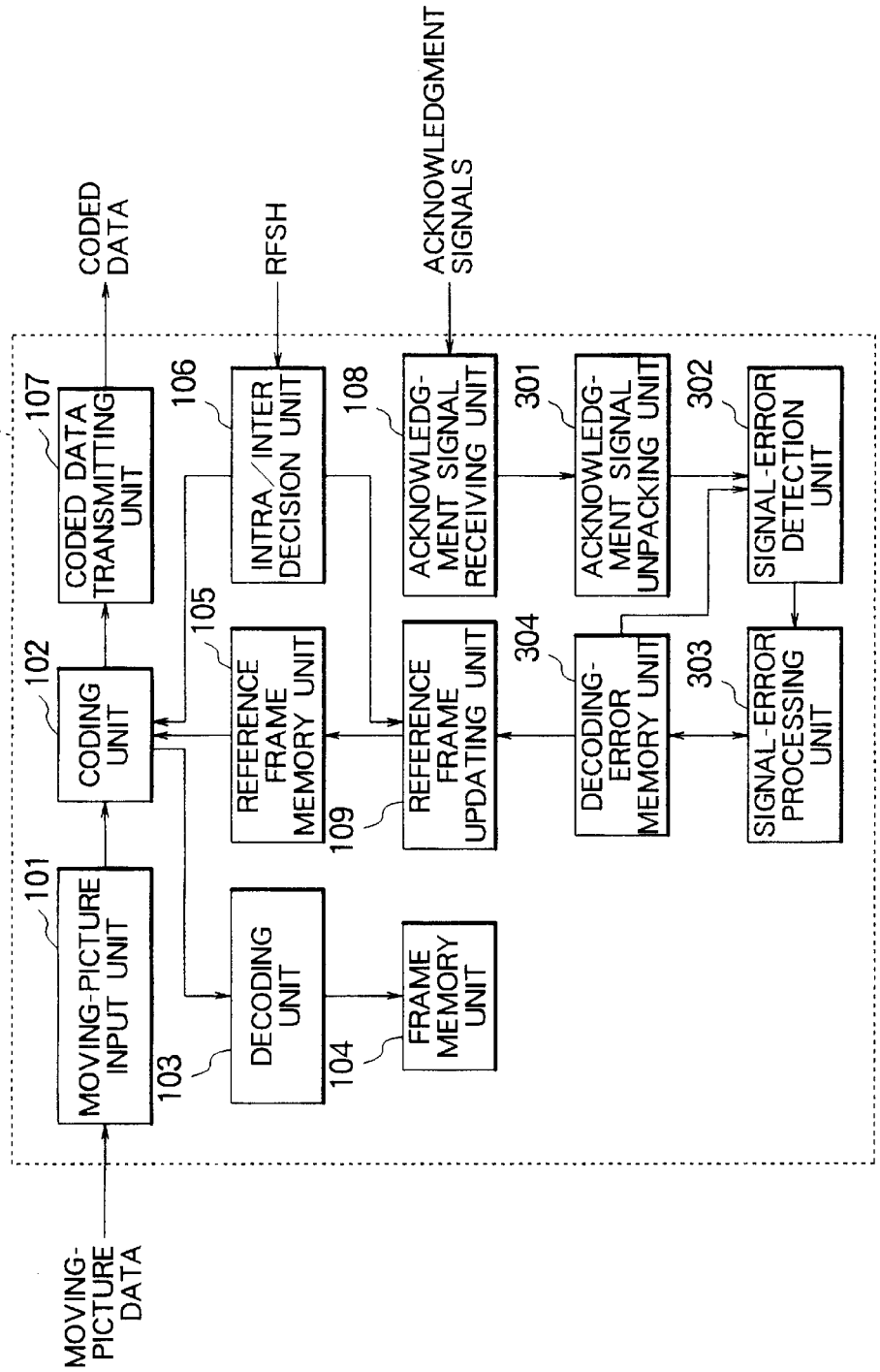
FIG. 9 is a functional block diagram of the picture coder in a second embodiment of the invention.

FIG. 9 shows the functional configuration of the moving-picture coder 300 in the second embodiment, using the same reference numerals 101–111 as in FIG. 1 for elements that also appeared in the first embodiment. Descriptions of these elements will be omitted insofar as they are identical to the corresponding elements in the first embodiment.

The new elements in FIG. 9 are a signal-error detection unit 302 and a signal-error processing unit 303. The signal-error detection unit 302 receives decoding-error information unpacked from an acknowledgment signal by the acknowledgment signal unpacking unit 110, compares this information with decoding-error information stored in the decoding-error memory unit ill, and notifies the signal-error processing unit 303 of the result of the comparison. The signal-error processing unit 303 writes decoding-error information in the decoding-error memory unit 111.

The decoding-error memory unit 111 differs from the decoding-error memory unit 111 in the first embodiment in having storage space for multiple copies of the decoding-error information pertaining to each block, enabling the decoding-error memory unit 111 to store information about the same block arriving in different acknowledgment signals.

Figure 10:
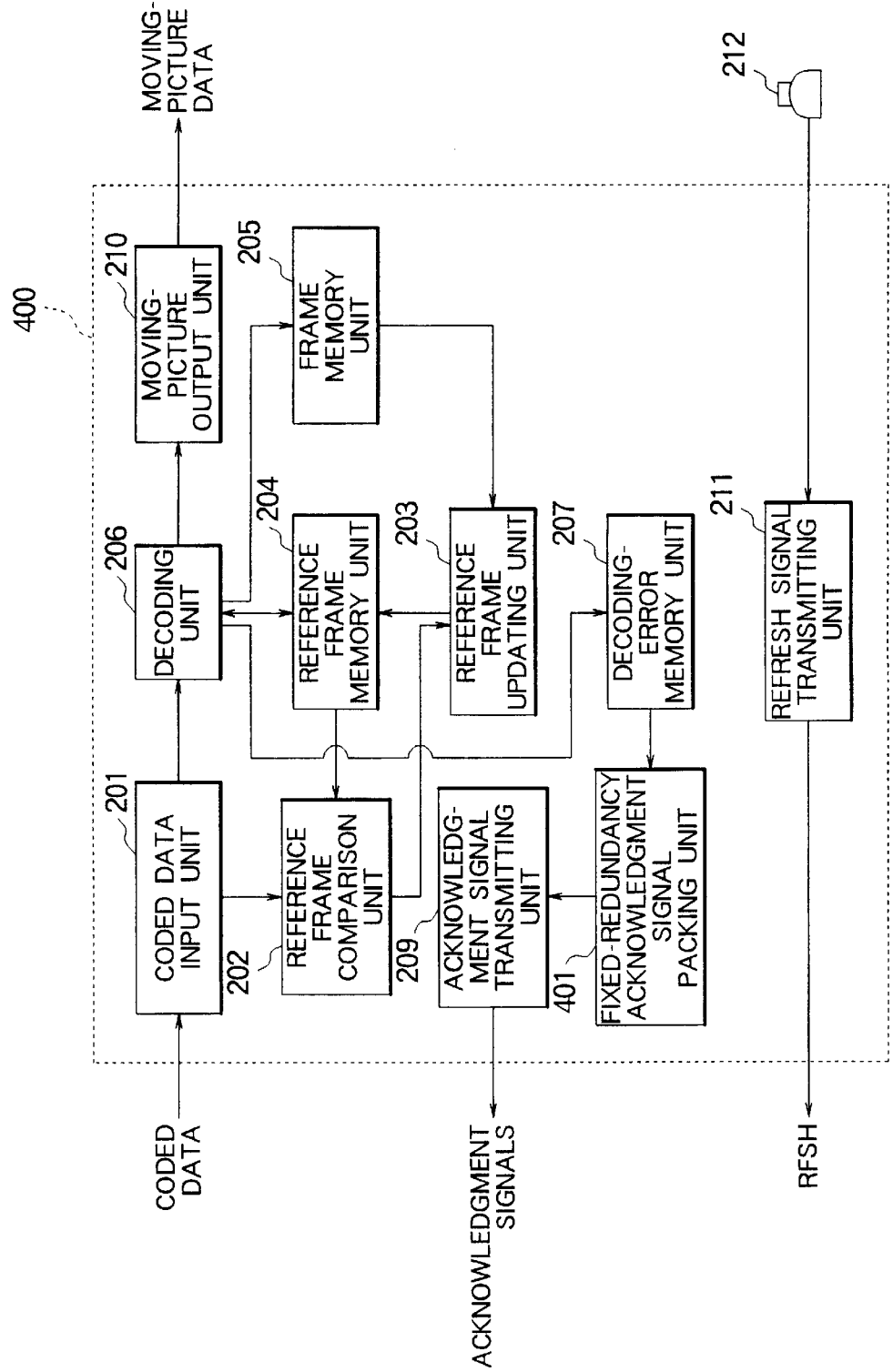
FIG. 10 is a functional block diagram of the picture decoder in the second embodiment.

FIG. 10 shows the functional configuration of the moving-picture decoder 400 in the second embodiment, using the same reference numerals 201–207 and 209–212 as in FIG. 2 for elements that also appeared in the first embodiment. Descriptions of these elements will be omitted.

The fixed-redundancy acknowledgment signal packing unit 401 in FIG. 10 is similar to the acknowledgment signal packing unit 208 in the first embodiment, except that it packs each item of decoding-error information stored in the decoding-error memory unit 207 into a fixed number (greater than one) of acknowledgment signals. Each acknowledgment signal contains both new decoding-error information, being transmitted for the first time, and old decoding-error information, that has already been transmitted in at least one other acknowledgment signal. The new decoding-error information pertains to a plurality of blocks. The old decoding-error information normally pertains to an equal or greater number of blocks.

Next, the operation of the new elements in the second embodiment will be described, taking as an example the case in which each frame is divided into nine blocks, the decoding-error information about each block is transmitted in three acknowledgment signals by using bit flags, and each acknowledgment signal has nine bit flags.

In this case, the fixed-redundancy acknowledgment signal packing unit 401 packs three new bit flags and six old bit flags into each acknowledgment signal. If, for example, a certain frame has just one decoding error, in the eighth block, and the next frame has no decoding errors, the fixed-redundancy acknowledgment signal packing unit 401 packs bit flags '111111101' into one acknowledgment signal, bit flags '111101111' into the next acknowledgment signal, and bit flags '101111111' into the next acknowledgment signal. The bit flags '11111101' start at the first block of the frame in question and indicate a decoding error in the eighth block of this frame. The bit, flags '111101111' start at the fourth block of this frame, repeat the indication of a decoding error in the eighth block, and indicate no decoding errors in the first three blocks of the next frame. The bit flags '101111111' start at the seventh block of the frame in question, repeat the decoding-error indication in the eighth block once again, and indicate no decoding errors in the first six blocks of the next frame.

When all acknowledgment signals containing decoding-error information about a given block in a given frame have been received and unpacked, the signal-error detection unit 302 compares the last-received decoding-error information with the information received earlier, which is stored in the decoding-error memory unit 111. If all of the received information agrees, the signal-error detection unit 302 notifies the signal-error processing unit 303, which finalizes the information and writes the finalized information in the decoding-error memory unit 111. The decoding-error memory unit 1II now contains a single indication (indicating either the presence or the absence of a decoding error) for the block.

If an acknowledgment signal is dropped in transmission, or acquires a detectable but uncorrectable error in transmission, its decoding-error information is not stored in the decoding-error memory unit 111. The signal-error detection unit 302 and signal-error processing unit 303 ignore such acknowledgment signals.

It may happen that different acknowledgment signals give conflicting information about the presence or absence of decoding errors in the same block. This can occur if an acknowledgment signal is corrupted by a transmission error that cannot be detected by the error-detection code 255. To resolve the conflict, the signal-error processing unit 303 follows a majority-vote rule, considering a block to have been successfully decoded if more than half of the relevant acknowledgment signals report no decoding error for that block. The signal-error processing unit 303 accordingly recognizes a decoding error if the error is reported in at least half of the acknowledgment signals.

Alternatively, the signal-error processing unit 303 can follow a more conservative rule by recognizing a decoding error whenever the error is reported in at least one acknowledgment signal. If this rule is followed, all cases of conflict among the decoding-error information in different acknowledgment signals are regarded as indicating decoding errors.

As a result of these measures, even if acknowledgment signals are occasionally dropped in transmission, or acquire uncorrectable signal errors in transmission, the moving-picture coder 300 can usually extract full coding-error information from other acknowledgment signals that arrive intact. Information is lost only if several consecutive acknowledgment signals are dropped or damaged.

Moreover, even if an acknowledgment signal arrives with an undetectable signal error and gives a false positive acknowledgment for a certain block, in most cases this will be recognized by the signal-error detection unit 302, by a comparison with the decoding-error information in other acknowledgment signals, and the false information will not be used.

If the fixed-redundancy acknowledgment signal packing unit 401 packs desired reference frame numbers into the acknowledgment signals, these desired reference frame numbers are preferably packed only once, e.g. in the first acknowledgment signal that reports a decoding error for the block in question. The reason is that the desired reference frame numbers are less critical than the decoding-error information itself.

Although the second embodiment requires more acknowledgment signals to be transmitted than in the first embodiment, or requires more blocks to be acknowledged in each acknowledgment signal, the amount of acknowledgment-signal traffic can still be less than in a conventional system transmitting a separate acknowledgment signal for each block. Thus the bandwidth gained by packing decoding-error information about multiple blocks into each acknowledgment signal can be used to enhance the reliability of the system by repeating the decoding-error information.

Third Embodiment

The third embodiment adjusts the number of repetitions of decoding-error information according to the rate at which decoding errors occur. The third embodiment is particularly useful when the quality of the channel from the moving-picture coder to the moving-picture decoder is correlated with the quality of the channel from the moving-picture decoder to the moving-picture coder.

The moving-picture coder in the third embodiment is identical to the moving-picture coder in the second embodiment, which is shown in FIG. 9.

Figure 11:
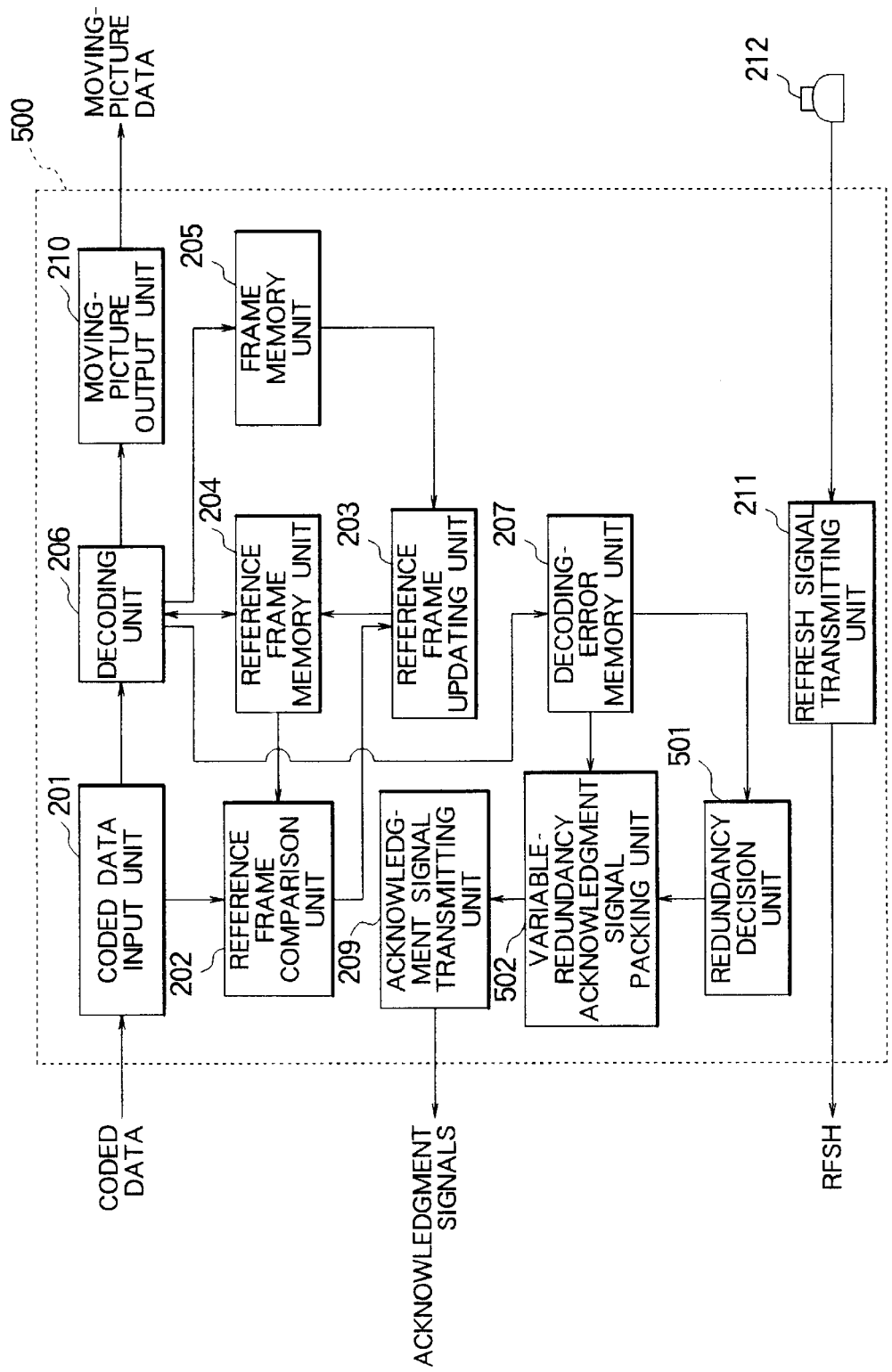
FIG. 11 is a functional block diagram of the picture decoder in a third embodiment of the invention.

FIG. 11 shows the functional configuration of the moving-picture decoder 500 in the third embodiment, using the same reference numerals 201–207 and 209–212 as in FIG. 2 for elements that also appeared in the first embodiment. Descriptions of these elements will be omitted.

The redundancy decision unit 501 in FTG. 11 reads the decoding-error information stored in the decoding-error memory unit 207 at periodic intervals, assesses the rate at which decoding errors have occurred during those intervals, and sets an appropriate redundancy value. Higher redundancy values are set for higher decoding-error rates, and lower redundancy values for lower decoding-error rates.

The variable-redundancy acknowledgment signal packing unit 502 packs the decoding-error information for each block into a number of acknowledgment signals determined by the redundancy value set by the redundancy decision unit 501.

The operation of the third embodiment is similar to the operation of the second embodiment, except that the number of times each item of decoding-error information is repeated depends on the rate of decoding errors. If the decoding-error rate varies over time, the redundancy of the acknowledgment signals is varied accordingly.

The signal-error detection unit 302 in the moving-picture coder can determine the number of times to expect each item of decoding-error information to be transmitted from the relative proportions of new and old decoding-error information in each acknowledgment signal. For example, if each acknowledgment signal contains decoding-error information for three new blocks and six old blocks, the signal-error detection unit 302 knows that each item of decoding-error information will be transmitted three times. If each acknowledgment signal contains decoding-error information for three new blocks and three old blocks, the signal-error detection unit 302 knows that each item of decoding-error information will be transmitted twice.

The redundancy decision unit 501 can determine the redundancy value according to various rules. One example is a rule that sets the redundancy value according to a low threshold and a high threshold. If the decoding-error rate is below the low threshold, the redundancy decision unit 501 specifies no redundancy: each item of (decoding-error information is transmitted just once. If the decoding-error rate is between the high and low thresholds, the redundancy decision unit 501 specifies double redundancy: each item of decoding-error information is transmitted twice. If the decoding-error rate is above the high threshold, the redundancy decision unit 501 specifies triple redundancy: each item of decoding-error information is transmitted three times.

The redundancy of the acknowledgment signals can be adjusted by changing the amount of old decoding-error information packed into each acknowledgment signal. If necessary, the amount of new decoding-error information packed into each acknowledgment signal, and hence the rate at which acknowledgment signals are sent, can also be changed.

The third embodiment enables the amount of bandwidth used for transmitting acknowledgment signals to be adjusted according to the decoding error rate, which directly reflects the quality of the transmission channel from the moving-picture coder to the moving-picture decoder, and indirectly reflects the quality of the transmission channel from the moving-picture decoder to the moving-picture coder. If the decoding-error rate becomes too high, the third embodiment attempts to improve the situation by increasing the redundancy of the acknowledgment signals. If a satisfactory decoding-error rate is achieved without redundant transmission of decoding-error information, the third embodiment can eliminate the redundancy, for a maximum saving of bandwidth.

Fourth Embodiment

The fourth embodiment is similar to the third embodiment, except that the amount of redundancy in the transmission of acknowledgment signals is set according to an assessment made in the picture coder.

Figure 12:
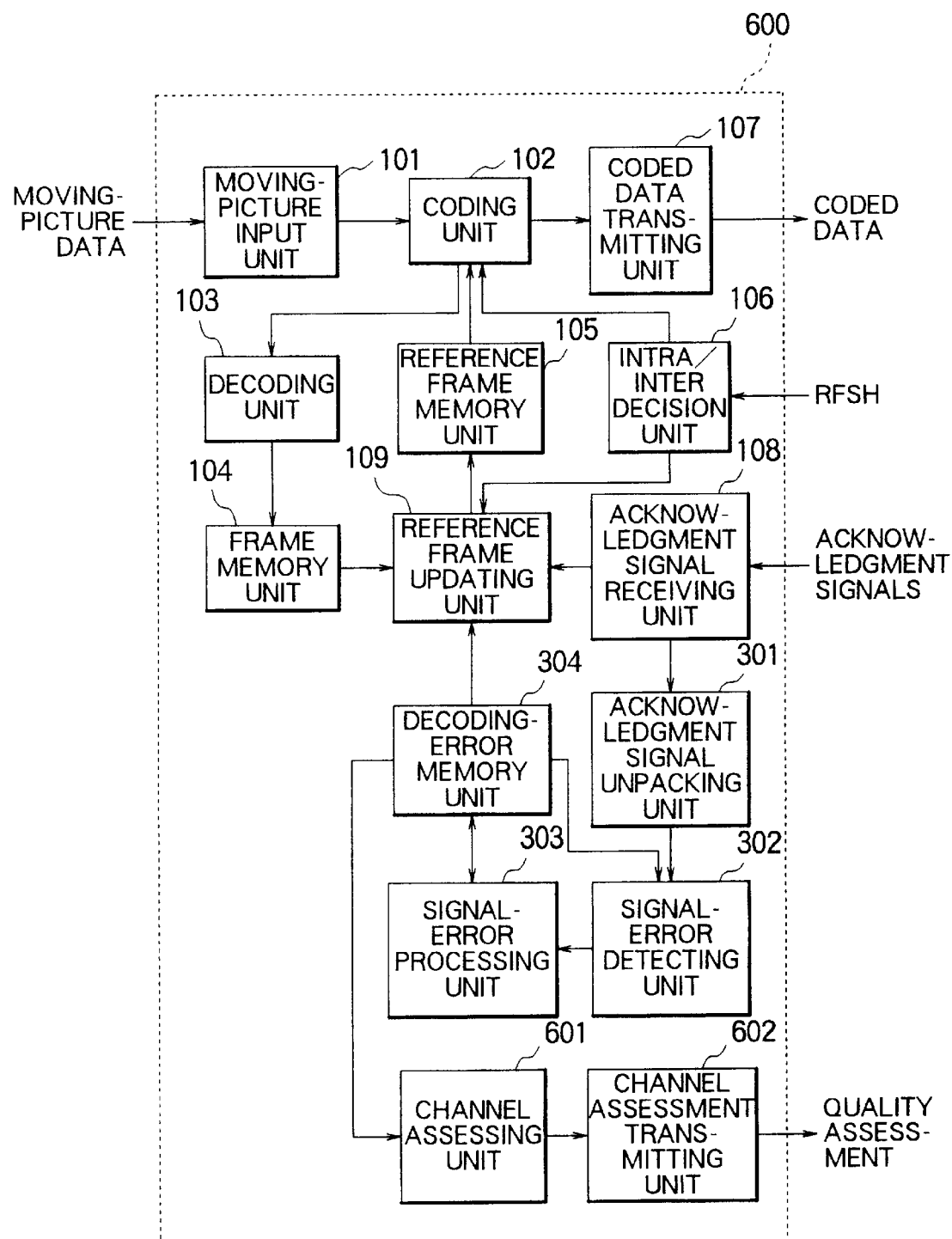
FIG. 12 is a functional block diagram of the picture coder in a fourth embodiment of the invention.

FIG. 12 shows the functional configuration of the moving-picture coder 600 in the fourth embodiment, using the same reference numerals 101–111 and 302–303 as in FIG. 9 for elements that also appeared in the second embodiment. Descriptions of these elements will be omitted, insofar as they are identical to the corresponding elements in the second embodiment.

The now elements in FIG. 12 are a channel assessing unit 601 and a channel assessment transmitting unit 602. The channel assessing unit 601 reads information from the decoding-error memory unit 111 indicating whether decoding-error information was received correctly or incorrectly, thereby assesses the quality of the transmission channel from the moving-picture decoder to the moving-picture coder, and outputs the resulting quality assessment. The channel assessment transmitting unit 602 transmits this quality assessment to the moving-picture decoder.

The decoding-error memory unit 111 in the fourth embodiment has space for storing not only the decoding-error information, but also flags indicating whether the decoding-error information was received correctly. When an acknowledgment signal fails to arrive, or arrives with an uncorrectable error, or when the signal-error detection unit 302 detects a signal error by comparing new and old decoding-error information, the signal-error processing unit 303 sets the corresponding flag or flags in the decoding-error memory unit 111 to indicate a signal error. The channel assessing unit 601 assesses channel quality by reading these flags at periodic intervals.

Figure 13:
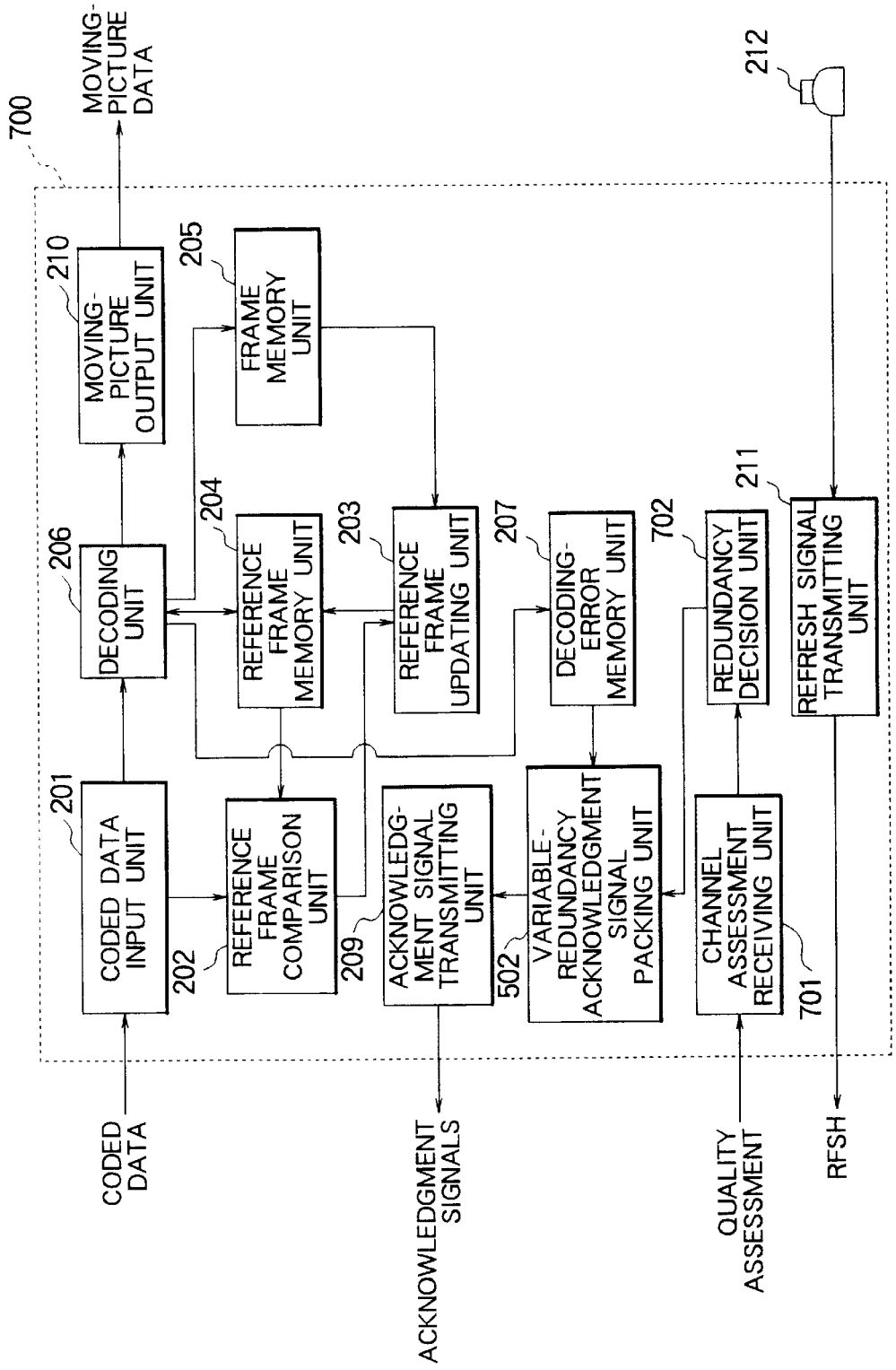
FIG. 13 is a functional block diagram of the picture decoder in the fourth embodiment.

FIG. 13 shows the functional configuration of the moving-picture decoder 700 in the fourth embodiment, using the same reference numerals 201–207, 209–212, and 502 as in FIG. 11 for elements that also appeared in the third embodiment. Descriptions of these elements will be omitted.

The new elements in FIG. 13 are a channel assessment receiving unit 701 and a redundancy decision unit 702. The channel assessment receiving unit 701 receives the channel quality assessment from the moving-picture coder 600. The redundancy decision unit 702 sets a redundancy value on the basis of this quality assessment.

The fourth embodiment operates in the same way as the third embodiment, except that the redundancy of decoding-error information in the acknowledgment signals is set directly in response to the quality of the acknowledgment-signal transmission channel, as assessed by the channel assessing unit 601. The assessment can be made in various ways. As one example, the channel assessing unit 601 can use high and low threshold values, and the channel assessment transmitting unit 602 can transmit a signal indicating whether the signal-error rate is below the low threshold, or above the high threshold, or between the high and low thresholds.

The fourth embodiment is particularly useful when the quality of the channel from the moving-picture coder to the moving-picture decoder is not closely correlated with the quality of the channel from the moving-picture decoder to the moving-picture coder. For example, when few decoding errors occur at the moving picture decoder but many signal errors occur in the acknowledgment signals, by increasing the redundancy of the acknowledgment signals, the fourth embodiment can enable the moving-picture coder to employ newer reference frames and thereby achieve a higher data-compression ratio than would otherwise be possible. Conversely, when few signal errors occur in the acknowledgment signals, the fourth embodiment saves bandwidth by reducing the redundancy of the acknowledgment signals, regardless of the decoding-error rate at the moving-picture decoder.

The embodiments described above can be modified in many ways. The fourth embodiment, for example, can be modified by having the channel assessing unit 601 at the moving-picture coder decide on a redundancy value directly, and having the channel assessment transmitting unit 602 transmit this desired redundancy value to the moving-picture decoder, instead of transmitting a channel assessment. That is, the channel assessing unit 601 can function as a redundancy decision unit, and the channel assessment transmitting unit 602 as a desired-redundancy transmitting unit.

The channel assessment or desired redundancy value need not be determined automatically by the channel assessing unit 601 in the fourth embodiment,; it can also be determined manually, in response to input from a human operator of the moving-picture coder. Similarly, the redundancy value in the third embodiment can be determined in response to manual input from a human operator of the moving-picture decoder. Manual input is particularly useful when a picture transmission system is being set up and tested.

The term 'block' has been used herein to designate a part of a frame for which a single decoding-error indication is returned. This part may correspond to what is called a macroblock or group of blocks in various coding standards. More generally, a 'block' may be any part of a frame, or even an entire frame. Needless to say, when there is only one block per frame, the block numbers shown in FIGS. 5, 6, 7, and 8 can be omitted.

In any of the embodiments, the decoding unit 103 in the moving-picture coder can be eliminated by storing the moving-picture data received by the moving-picture input unit 101 in the frame memory unit 104. When intra-frame coding is performed, the decoded data (or original input data) can be stored directly in the reference frame memory unit 105, bypassing the frame memory unit 104.

The frame memory unit 104 and reference frame memory unit 105 in the moving-picture coder can be combined into a single memory unit by using pointers to indicate reference frames. The reference frame memory unit, 204 and frame memory unit 205 in the moving-picture decoder can be similarly combined. In any of these memory units, data can be deleted when no longer needed, or new data can simply be overwritten on old data.

The refresh signal can be generated automatically, instead of in response to manual input at the moving-picture decoder. For example, a refresh signal can be generated automatically if decoding errors persist in the same block in a certain number of successive frames.

The functions of the moving-picture coders and moving-picture decoders described in the embodiments above may be implemented in hardware, software, or a mixture of hardware and software.

The coded data need not represent a moving picture, as long as the data represents a series of frames, each consisting of one or more blocks, and at least some of the blocks in at least some of the frames are coded by inter-frame coding. In principle, the frames could be frames of audio data, or arbitrary binary data.

Although the embodiments above have been described in terms of point-to-point communication between a transmitting device and a receiving device, the invention can also be practiced in a multicasting system, in which one transmitting device transmits the same coded data simultaneously to a plurality of receiving devices. Each receiving device sends back acknowledgment signals, and the transmitting device selects reference frames that were successfully decoded at all receiving devices.

Those skilled in the art will recognize that still further variations are possible within the scope of the invention as claimed below.

What is claimed is:

1. An improved coder of the type having a coding means for coding a series of frames by intra-frame coding and inter-frame coding, a transmitting means for transmitting resulting coded data to a decoder through a first channel, and a reference frame updating means for selecting reference frames for use in inter-frame coding, each frame in the series of frames bing coded as a certain number of blocks, the certain number being an arbitrary positive integer, said improved coder comprising:

an acknowledgment signal receiving means for receiving acknowledgment signals from said decoder through a second channel, each acknowledgment signal among the acknowledgment signals pertaining to a plurality of blocks;

an acknowledgment signal unpacking means, coupled to said acknowledgment signal receiving means, for unpacking each acknowledgment signal, thereby obtaining decoding-error information about individual blocks in the plurality of blocks; and a decoding-error memory means, coupled to said acknowledgment signal unpacking means, for storing the decoding-error information, and furnishing the decoding-error information to the reference frame updating means for use by said reference frame updating means in selecting the reference frames.

2. The coder of claim 1, wherein the series of frames constitutes a moving picture.

3. The coder of claim 1, wherein each frame in the series of frames includes just one block.

4. The coder of claim 1, wherein each frame in the series of frames includes a plurality of blocks.

5. The coder of claim 1, wherein the decoding-error information about each individual block is transmitted repeatedly in at least two different acknowledgment signals, further comprising:
   a signal-error detection means coupled to said decoding-error memory means, for detecting errors in the decoding-error information by comparing the decoding-error information received in different acknowledgment signals; and
   a signal-error processing means coupled to said signal-error detection means, for resolving conflicts in the decoding-error information when said signal-error detection means detects an error therein.

6. The coder of claim 5 wherein, when said signal-error detection means detects a conflict in the decoding-error information received in different acknowledgment signals for a single block, said signal-error processing means resolves the conflict according to a majority-vote rule.

7. The coder of claim 5 wherein, when said signal-error detection means detects a conflict in the decoding-error information received in different acknowledgment signals for a single block, said signal-error processing means sets the decoding-error information for that block to indicate that a decoding error was present.

8. The coder of claim 5, further comprising:
   a channel assessing means, coupled to said decoding-error memory means, for assessing frequency of signal errors in the acknowledgment signals and producing thereby a quality assessment of said second channel; and
   a channel assessment transmitting means, coupled to said channel assessing means, for transmitting the quality assessment to said decoder.

9. The coder of claim 5, further comprising:
   a redundancy decision means for determining a desired number of times for the decoding-error information to be repeated in the acknowledgment signals; and
   a desired-redundancy transmitting means, coupled to said redundancy decision means, for notifying said decoder of the desired number of times for the decoding-error information to be repeated in the acknowledgment signals, as determined by said redundancy decision means.

10. The coder of claim 9, wherein said redundancy decision means determines the desired number of times according to a frequency of signal errors in the acknowledgment signals.

11. The coder of claim 9, wherein said redundancy decision means determines the desired number of times according to manual input from a human operator of said coder.

12. An improved decoder of the type having an input means for receiving coded data representing a series of frames from a coder through a first channel, and a decoding means for decoding the coded data by intra-frame decoding and inter-frame decoding, wherein said decoding means decodes each frame in the series of frames as a certain number of blocks, the certain number being an arbitrary positive integer, and performs inter-frame decoding by decoding a block in one frame with reference to a corresponding block in preceding frame specified as a reference frame in the coding data, the reference frame being changed when a decoding error occurs, said improved coder comprising:
   a decoding-error memory means for storing decoding-error information about the blocks:
   an acknowledgment signal packing mean, coupled to said decoding-error memory means, for constructing an acknowledgment signal by packing the decoding-error information of a plurality of the blocks into the acknowledgment signal, the acknowledgment signal identifying the blocks in the plurality of blocks individually; and
   an acknowledgment signal transmitting means, coupled to said acknowledgment signal packing means, fro transmitting the acknowledgment signal to said coder through a second channel.

13. The decoder of claim 12, wherein the series of frames constitutes a moving picture.

14. The decoder of claim 12, wherein each frame in the series of frames includes just one block.

15. The decoder of claim 12, wherein each frame in the series of frames includes a plurality of blocks.

16. The decoder of claim 12, wherein said acknowledgment signal packing means places desired reference frame numbers in the acknowledgment signals for blocks having decoding errors.

17. The decoder of claim 12, wherein said acknowledgment signal packing means places block numbers in the acknowledgment signals to identify blocks that were decoded without error.

18. The decoder of claim 12, wherein said acknowledgment signal packing means places block numbers in the acknowledgment signals to identify blocks in which decoding errors occurred.

19. The decoder of claim 12, wherein said acknowledgment signal packing means uses bit flags in the acknowledgment signals to identify blocks in which decoding errors occurred.

20. The decoder of claim 12, wherein said acknowledgment signal packing means repeats decoding-error information about a single block in different acknowledgment signals.

21. The decoder of claim 20, wherein said acknowledgment signal packing means places a desired reference frame number for a block having a decoding error in one acknowledgment signal among the different acknowledgment signals.

22. The decoder of claim 20, further comprising a redundancy decision means for determining a number of times to repeat the decoding-error information about a single block.

23. The decoder of claim 22, wherein said redundancy decision means determines the number of times according to a frequency of decoding errors.

24. The decoder of claim 22, wherein said redundancy decision means determines the number of times according to manual input from a human operator of said decoder.

25. The decoder of claim 22, further comprising an assessment receiving means for receiving an assessment of channel quality from said coder, wherein said redundancy decision means determines the number of times according to the assessment received by said assessment receiving means.

26. The decoder of claim 22, further comprising a redundancy receiving means, coupled to said redundancy decision means, for receiving from said coder a desired number of times for the decoding-error information to be repeated.

27. An improved method of transmitting a series of frames from a transmitting device, of the type in which each frame in the series of frames includes a certain number of blocks, the certain number being a positive integer, and at least some of the blocks in at least some of the frames are coded by inter-frame coding in the transmitting device, transmitted to the receiving device, then decoded by inter-frame decoding in the receiving device, the inter-frame coding and inter-frame decoding being performed with reference to corresponding blocks in a preceding frame designated as a reference frame, said improved method comprising:

packing decoding-error information about a plurality of the blocks into an acknowledgment signal at the receiving device, the decoding-error information indicating whether decoding errors occurred in respective blocks;

transmitting the acknowledgment signal from the receiving device to the transmitting device;

unpacking the acknowledgment signal at the transmitting device, thereby obtaining decoding-error information about individual blocks in the plurality of blocks; and selecting reference frames at the transmitting device according to the decoding-error information.

28. The method of claim 27, wherein the series of frames constitute a moving picture.

29. The method of claim 27, wherein each frame in the series of frames includes just one block.

30. The method of claim 27, wherein each frame in the series of frames includes a plurality of blocks.

31. The method of claim 27, further comprising placing desired reference frame numbers in the acknowledgment signals for blocks having decoding errors.

32. The method of claim 27, wherein said packing comprises placing block numbers in the acknowledgment signal to identify blocks having decoding errors.

33. The method of claim 27, wherein said packing comprises placing block numbers in the acknowledgment signal to identify blocks not having decoding errors.

34. The method of claim 27, wherein said packing comprises setting bit flags in the acknowledgment signal to identify blocks having decoding errors.

35. The method of claim 27, wherein the decoding-error information about each individual block is repeated a certain number of times in different acknowledgment signals.

36. The method of claim 35, further comprising placing a desired reference frame number for a block having a decoding error in one acknowledgment signal among the different acknowledgment signals.

37. The method of claim 35, further comprising:

storing the decoding-error information in a memory means at the transmitting device:

detecting signal errors in the acknowledgment signals by comparing the decoding-error information received in the different acknowledgment signals; and resolving conflicts in the decoding-error information received in the different acknowledgment signals.

38. The method of claim 37, wherein the conflicts are resolved according to a majority-vote rule.

39. The method of claim 37, wherein the conflicts are resolved by recognizing a decoding error whenever there is a disagreement in the decoding-error information received in different acknowledgment signals for a single block.

40. The method of claim 37, further comprising:

determining the number of times to repeat the decoding-error information at the receiving device according to a frequency of said decoding errors.

41. The method of claim 37, further comprising:

determining the number of times to repeat the decoding-error information at the receiving device according to manual input from a human operator of the receiving device.

42. The method of claim 35, further comprising:

determining the number of times to repeat the decoding-error information at the transmitting device according to a frequency of signal errors in the acknowledgment signals.

43. The method of claim 37, further comprising:

determining the number of times to repeat the decoding-error information at the transmitting device, according to manual input from a human operator of the transmitting device.

44. The method of claim 37, further comprising:

assessing frequency of signal errors in the acknowledgment signals at the transmitting device and thereby producing a quality assessment of a channel on which the acknowledgment signals are transmitted from the receiving device to the transmitting device;

transmitting the quality assessment from the transmitting device to the receiving device;

determining the number of times to repeat the decoding-error information at the receiving device according to the quality assessment.

* * * * *